(12) United States Patent
Ha et al.

(10) Patent No.: US 7,724,271 B2
(45) Date of Patent: May 25, 2010

(54) APPARATUS AND METHOD OF TRANSFORMING MULTIDIMENSIONAL VIDEO FORMAT

(75) Inventors: Tae-hyeun Ha, Suwon-si (KR); Tae-hee Kim, Suwon-si (KR); Sung-sik Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/181,860

(22) Filed: Jul. 15, 2005

(65) Prior Publication Data
US 2006/0062490 A1   Mar. 23, 2006

Related U.S. Application Data

(60) Provisional application No. 60/587,903, filed on Jul. 15, 2004.

(30) Foreign Application Priority Data

Oct. 1, 2004   (KR) ...................... 10-2004-0078405

(51) Int. Cl.
*G09G 5/02* (2006.01)

(52) U.S. Cl. ..................................... 345/698

(58) Field of Classification Search ................. 345/698, 345/699
See application file for complete search history.

(56) References Cited

U.S. PATENT DOCUMENTS

| | | | | |
|---|---|---|---|---|
| 5,721,588 | A * | 2/1998 | Fujiwara et al. | 375/240.15 |
| 6,327,000 | B1 * | 12/2001 | Auld et al. | 348/441 |
| 6,507,358 | B1 * | 1/2003 | Mori et al. | 348/42 |
| 6,704,042 | B2 * | 3/2004 | Matsui et al. | 348/43 |
| 6,882,346 | B1 * | 4/2005 | Lefebvre et al. | 345/506 |
| 2002/0030675 | A1 | 3/2002 | Kawai | |
| 2002/0122585 | A1 | 9/2002 | Swift et al. | |
| 2003/0112507 | A1 * | 6/2003 | Divelbiss et al. | 359/464 |
| 2004/0164925 | A1 * | 8/2004 | Boger | 345/3.1 |
| 2004/0218269 | A1 * | 11/2004 | Divelbiss et al. | 359/464 |
| 2005/0035963 | A1 * | 2/2005 | Iizuka et al. | 345/419 |
| 2005/0078108 | A1 * | 4/2005 | Swift et al. | 345/419 |

(Continued)

FOREIGN PATENT DOCUMENTS

JP   9-121370 A   5/1997

(Continued)

OTHER PUBLICATIONS

Man Bae Kim, et al., "The adaptation of 3D stereoscopic video in MPEG-21 DIA", Signal Processing: Image Communication, vol. 18, No. 8, Sep. 2003, pp. 685-697.

*Primary Examiner*—Ulka Chauhan
*Assistant Examiner*—Jeffrey J Chow
(74) *Attorney, Agent, or Firm*—Sughrue Mion, PLLC

(57) ABSTRACT

Provided are an apparatus and a method of transforming a format of a multidimensional image so that the multidimensional image can be output by any type of display device. The apparatus includes a scaler and a formatter. The scaler receives the multidimensional image and scales up or down a resolution of the multi-dimensional image. The formatter receives property information about a display device and transforms the format of the multi-dimensional image to conform to properties of the display device. Accordingly, a three-dimensional image or a stereo image can be easily displayed by any type of display device.

14 Claims, 5 Drawing Sheets

U.S. PATENT DOCUMENTS

2005/0168480 A1 *   8/2005   MacInnis et al. ............ 345/592

FOREIGN PATENT DOCUMENTS

| JP | 10-269377 A | 10/1998 |
| KR | 2000-0075982 A | 12/2000 |
| KR | 2002-0095554 A | 12/2002 |
| KR | 10-2004-0000154 A | 1/2004 |
| KR | 10-2004-0001831 A | 1/2004 |
| WO | WO 99/56246 A1 | 11/1999 |
| WO | WO 2004/066203 A2 | 8/2004 |

* cited by examiner

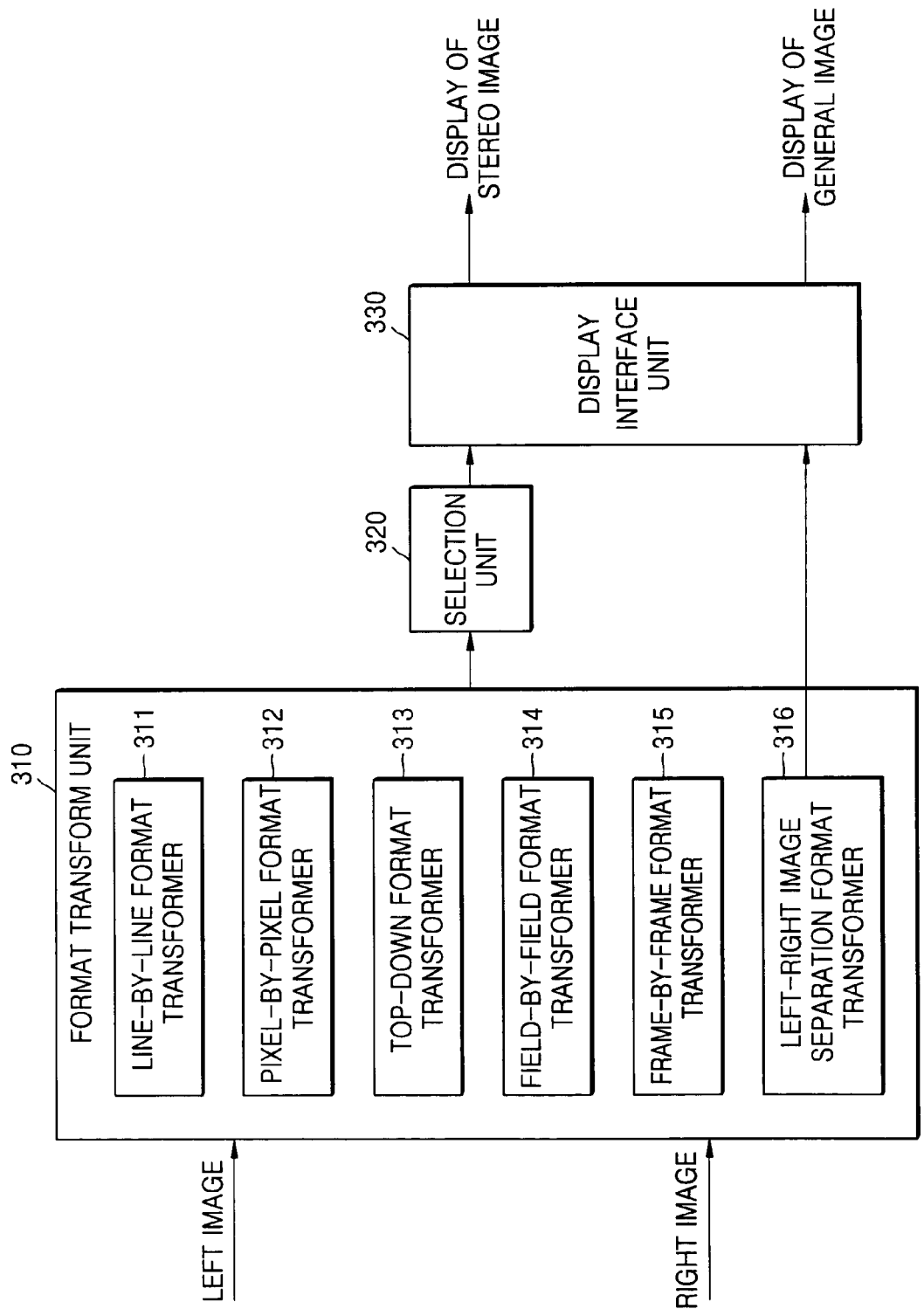

APPARATUS AND METHOD OF TRANSFORMING MULTIDIMENSIONAL VIDEO FORMAT

This application claims the benefit of Korean Patent Application No. 10-2004-0078405, filed on Oct. 1, 2004, in the Korean Intellectual Property Office, and the benefit of U.S. Provisional Patent Application No. 60/587,903, filed on Jul. 15, 2004, in the U.S. Patent and Trademark Office, the disclosures of which are incorporated herein in their entirety by reference.

BACKGROUND OF THE INVENTION

1. Field of the Invention

The present invention relates to transformation of a multidimensional video format, and more particularly, to an apparatus and a method of transforming a format of a multidimensional image so that the multidimensional image can be output by any type of display device.

2. Description of the Related Art

In digital broadcasting, an analog signal, such as, video data, audio data, and other data, is transformed into a digital signal, the digital signal is compressed and transmitted, the compressed digital signal is transformed into the original analog signal, and the original analog signal is reproduced. Accordingly, digital broadcasting provides a high-quality service compared with conventional analog broadcasting. Research into reception and display of a three-dimensional image using this digital broadcasting technique is under way. To transceive and display a three-dimensional image, a multi-view image should be produced and transmitted. However, research into transmission and display of a stereo image precedes the research into the reception and display of the three-dimensional image due to the limitations of the current network environment.

A display device processes only an image format determined depending on characteristics of the display device. Since there are various types of display devices, a format of a multidimensional image should be transformed to conform to a predetermined format of a display device to display the multidimensional image.

SUMMARY OF THE INVENTION

The present invention provides an apparatus and a method of transforming a format of a multidimensional image into a format that can be processed by a display device.

Consistent with an aspect of the present invention, there is provided an apparatus for transforming a format of a multi-dimensional image, the apparatus comprising: a scaler receiving the multidimensional image and scaling up or down a resolution of the multi-dimensional image; and a formatter receiving property information about a display device and transforming the format of the multi-dimensional image to conform to properties of the display device.

The scaler may differentiate rates at which a horizontal resolution and a vertical resolution of the multidimensional image are transformed and rates at which images of multiple dimensions are scaled, to transform the resolution of the multidimensional image.

The apparatus may further include a user interface unit providing an input/output interface which receives property information about the display device to control the formatter. The user interface unit may be a display data channel (DDC) port, a DDC2 port, or a DDC2B port which transceive a resolution, information about a frequency of an input signal, and information about a format of an image, which are the property information about the display device.

The formatter may include: a format transform unit transforming the received multidimensional image into an image having at least one format; a selection unit selecting a format processible by the display device from the produced formats; and a display interface unit transforming an image having the selected format into an image signal acceptable by the display device and outputting the image signal.

Consistent with another aspect of the present invention, there is provided a method of transforming a format of a multidimensional image, the method including the operations of: receiving the multidimensional image and scaling up or down a resolution of the multi-dimensional image; and receiving property information about a display device and transforming the format of the multi-dimensional image to conform to properties of the display device.

The operation of receiving the property information and transforming the format of the multi-dimensional image may include: receiving the property information about the display device; transforming the received multidimensional image into an image having at least one format; selecting a format processible by the display device from the produced formats; and transforming an image having the selected format into an image signal acceptable by the display device and outputting the image signal.

BRIEF DESCRIPTION OF THE DRAWINGS

The above and other features and advantages of the present invention will become more apparent by describing in detail exemplary embodiments thereof with reference to the attached drawings in which:

FIG. 3 is a detailed block diagram of a formatter according to an exemplary embodiment of the present invention;

DETAILED DESCRIPTION OF THE INVENTION

Figure 1:
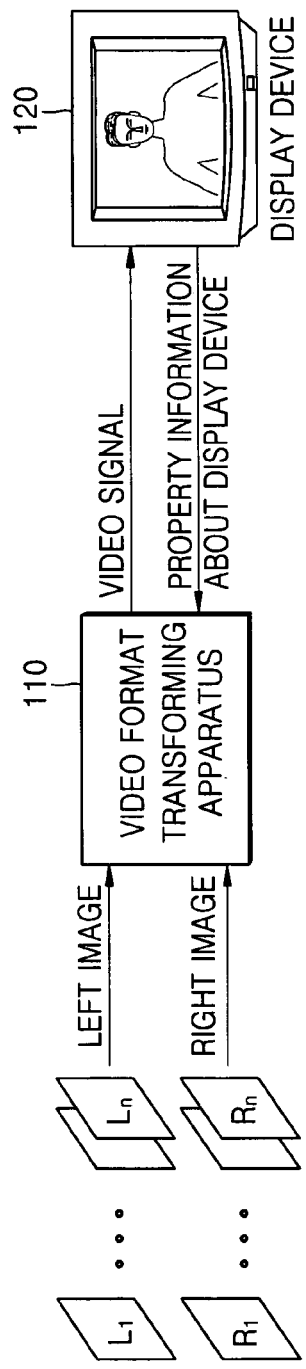
FIG. 1 illustrates a connection of a video format transforming apparatus according to the present invention and a display device.

FIG. 1 illustrates a connection of a video format transforming apparatus 110 according to the present invention and a display device 120. The video format transforming apparatus 110 can receive and process a multidimensional image which is a multi-view image. However, for example, in FIG. 1, the video format transforming apparatus 110 processes a stereo image.

The video format transforming apparatus 110 receives a multidimensional image or a stereo image. The stereo image is comprised of a left image and a right image. The left image is comprised of frames $L_1, L_2, \ldots,$ and $L_n$, and the right image is comprised of frames $R_1, R_2, \ldots,$ and $R_n$. The video format transforming apparatus 110 transforms a format of the received stereo image so as to conform to a format that can be processed by the display device 120. More specifically, the video format transforming apparatus 110 scales up or down the received stereo image with a resolution suitable for the display device 120, transforms a format of the frames of the stereo image, and outputs a stereo image having a frame format suitable for the display device 120. Since the display device 120 generally receives and processes a signal conforming to a Video Electronics Standard Association (VESA) specification, the video format transforming apparatus 110 produces a video signal that conforms to the VESA specification, and transmits the video signal to the display device 120.

To produce a video format suitable for the display device 120, the video format transforming apparatus 110 receives characteristic information about the display device 120 via an external port to find out characteristics of the display device 120. The characteristic information about the display device 120 and the external port will be described later.

Figure 2:
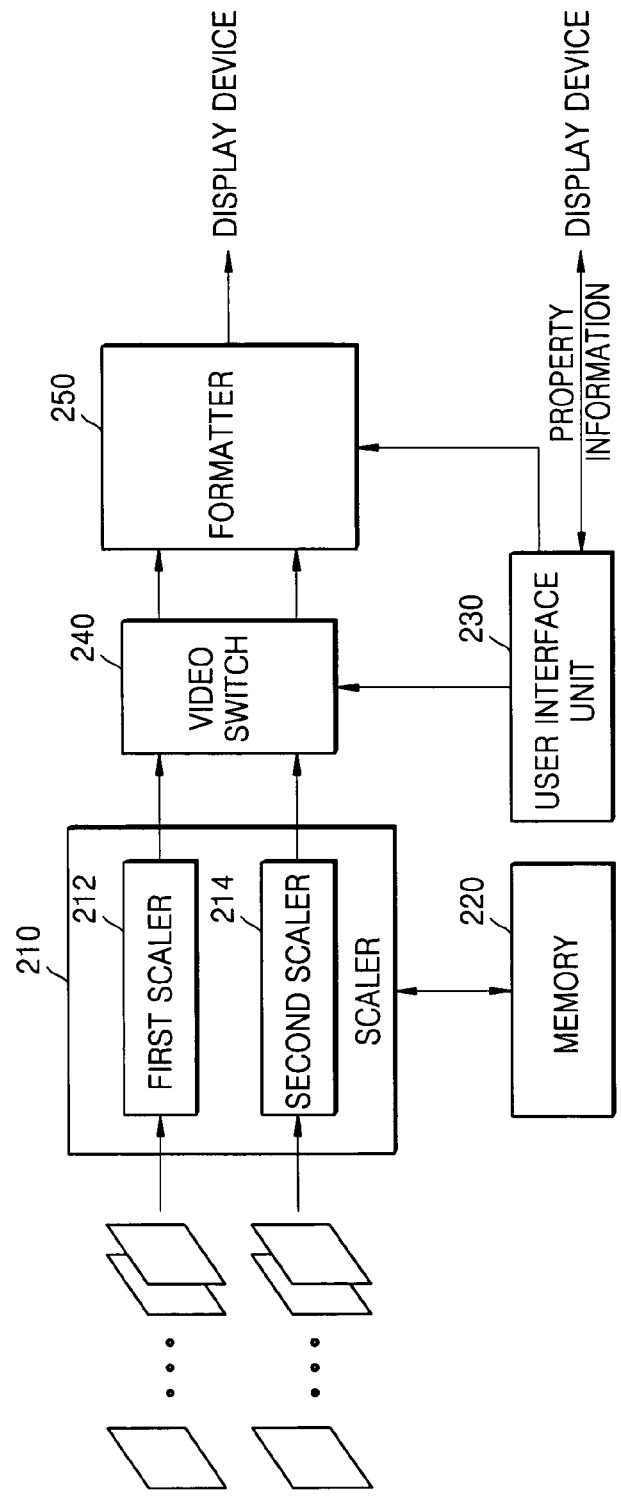
FIG. 2 is a block diagram of a video format transforming apparatus according to an exemplary embodiment of the present invention.

FIG. 2 is a block diagram of a video format transforming apparatus according to an exemplary embodiment of the present invention. The video format transforming apparatus includes a scaler 210, a memory 220, a user interface unit 230, a video switch 240, and a formatter 250. The scaler 210 includes first and second scalers 212 and 214 to process a stereo image. If a multidimensional image is processed, more scalers than the first and second scalers 212 and 214 may be needed depending on the number of dimensions.

The scaler 210 receives a multidimensional image and scales the same to conform to a resolution of a display device. For example, the display device is set to display an image with a specific format, such as, a 720×480 format, a 1024×768 format, or the like, and the multidimensional image has various resolutions. Hence, a resolution of the received multidimensional image is transformed to conform to the resolution of the display device. A horizontal transformation and a vertical transformation may be different, and scaling operations of a left image and a right image may be performed at different rates.

The video switch 240 switches the locations of the left and right images and outputs the switched left and right images to the formatter 250. More specifically, when it cannot be recognized which one of the received images is the left or right image, the video switch 240 switches the locations of the left and right images and outputs the switched left and right images to the formatter 250. The memory 220 stores scaled image data. In other words, the memory 220 temporarily stores the scaled image so that the left and right images can be output at the same time. The memory 220 may be an SDRAM or the like.

The user interface unit 230 switches the video switch 240 in response to a video switching command received from a user or provides an interface through which a control command is received from the user to control the formatter 250 so that a format of the scaled image suits to the display device. To control the formatter 250 so that a format of the scaled image is appropriate for the display device, the user interface unit 230 receives property information about the display device via a serial port or the like. Examples of the property information about the display device include a resolution, information about a frequency of an input signal, information about a format of an image, and the like. For example, a display data channel (DDC), a DDC2, a DDC2B, or the like may be used as a port for transceiving the property information about the display device. DDC provides a sort of a Plug and Play (PnP) function in which a monitor transmits its information to a connected computer. 2 and 2B in the DDC2 and DDC2 denote versions. Hence, if using the PnP function, the display device outputs its property information to the outside via a DDC port, and the user interface unit 230 receives the property information about the display device from the display device and transmits the same to the video switch 240 and the formatter 250.

The formatter 250 transforms the format of the scaled image to conform to properties of the display device. The video format transformation will be described later with reference to FIGS. 4A through 4F.

FIG. 3 is a detailed block diagram of a formatter according to an exemplary embodiment of the present invention. The formatter includes a format transform unit 310, a selection unit 320, and a display interface unit 330. The format transform unit 310 produces received left and right images having various formats. To achieve this, the format transform unit 310 includes a line-by-line format transformer 311, a pixel-by-pixel format transformer 312, a top-down format transformer 313, a field-by-field format transformer 314, a frame-by-frame format transformer 315, and a left-right image separation format transformer 316. The line-by-line format, the pixel-by-pixel format, the top-down format, the field-by-field format, the frame-by-frame format, and the left-right image separation format will be described later with reference to FIGS. 4A through 4F.

The selection unit 320 selects a format processible by the display device among the formats produced by the format transform unit 310. The display interface unit 330 transforms an image having the selected format into an image signal acceptable by the display device and outputs the image signal. Since an image is generally produced based on the VESA standard, the display interface unit 330 outputs an image having a VESA format.

Figure 4A:
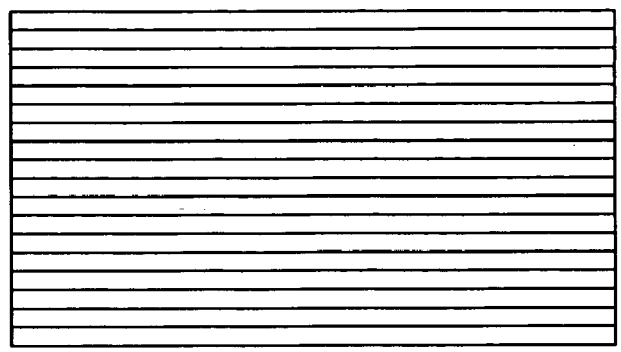
FIGS. 4A through 4F illustrate various video formats.
Figure 4B:
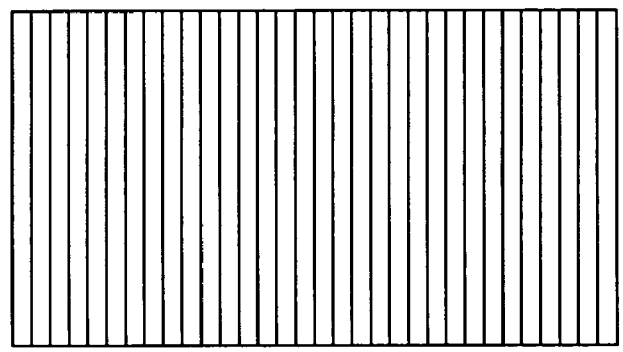
Figure 4C:
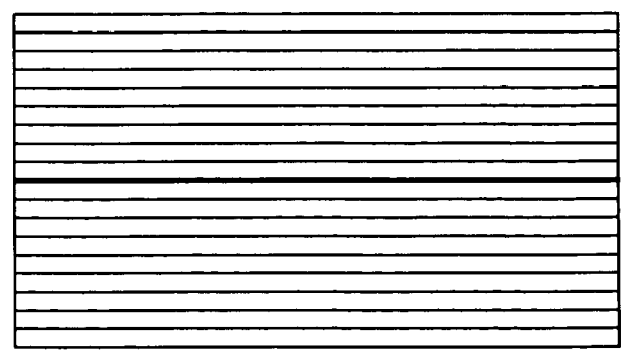
Figure 4D:
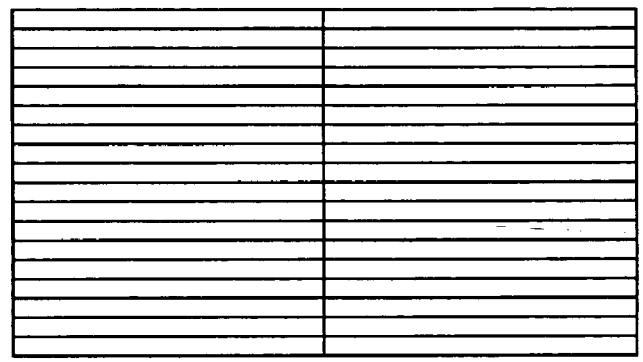
Figure 4E:
Figure 4F:
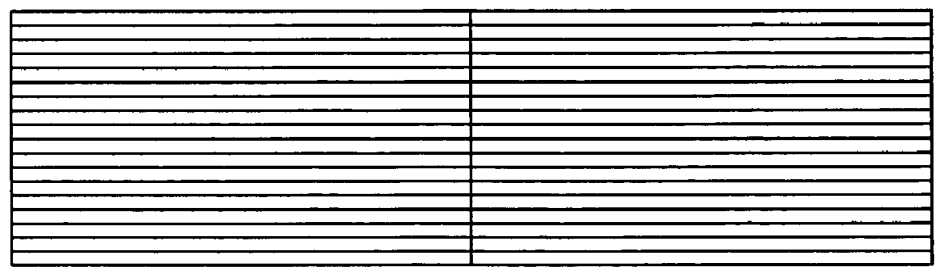

FIGS. 4A through 4F illustrate various video formats. FIG. 4A illustrates a line-by-line image, FIG. 4B illustrates a pixel-by-pixel image, FIG. 4C illustrates a top-down image, FIG. 4D illustrates a side-by-side image, FIG. 4E illustrates a field-by-field image, and FIG. 4F illustrates a frame-by-frame image. In other words, the format transform unit 310 produces these images.

Figure 5:
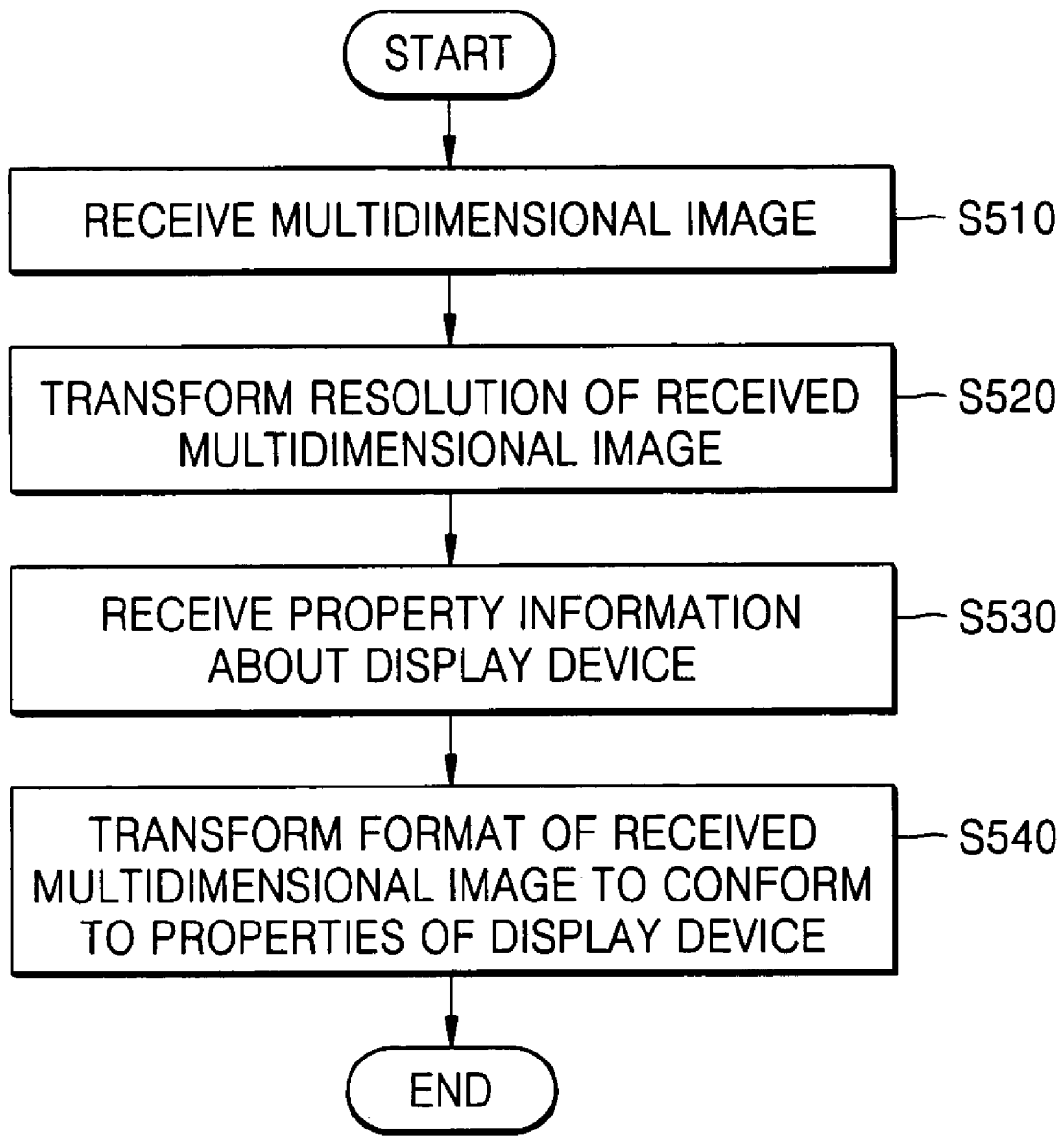
FIG. 5 is a flowchart illustrating a video format transforming method according to an exemplary embodiment of the present invention.

FIG. 5 is a flowchart illustrating a video format transforming method according to an exemplary embodiment of the present invention. In operation S510, a multidimensional image is received. In the present embodiment, a stereo image is received. Thereafter, in operation S520, a resolution of the received multidimensional image is scaled up or down. To transform the resolution of a multidimensional image, a horizontal resolution and a vertical resolution may be transformed at different rates, and images of multiple dimensions may be scaled at different rates. If a stereo image is received, a left image can be output via a right image output port, and a right image can be output via a left image output port.

Then, in operation S530, property information about a display device is received. Examples of the property information about the display device include a resolution, information about a frequency of an input signal, information about a format of an image, and the like. The property information about the display device may be received via a DDC, a DDC2, or a DDC2B. Finally, in operation S540, the format of the received multidimensional image is transformed to conform to the properties of the display device. More specifically, the property information about the display device is received, the received multidimensional image is transformed into an image having at least one format, a format processible by the display device is selected from produced formats, the multidimensional image is transformed into an image signal acceptable by the display device, and the image signal is output to the display device. Since the display device generally receives a signal conforming to the VESA standard, the display device outputs a signal having the VESA format.

As described above, in the present invention, a format of a three-dimensional image or a stereo image is transformed to conform to characteristics of a display device, so that the three-dimensional image or the stereo image can be easily displayed by any type of display device.

The method of transforming a format of a multidimensional image can be written as computer programs. Codes and code segments that constitute the computer programs can be easily construed by programmers skilled in the art to which the present invention pertains. Also, the computer programs are stored in computer readable media and read and executed by computers to accomplish the transforming method. Examples of the computer readable recording media include magnetic storage media, optical recording media, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for transforming a format of a multidimensional image, the apparatus comprising:
   a scaler receiving the multidimensional image and scaling up or down a resolution of the multi-dimensional image to conform to a resolution of a display device
   a formatter receiving property information about properties of the display device and transforming the format of the multi-dimensional image to conform to the properties of the display device; and
   a user interface receiving the property information from the display device and transmitting the property information to the formatter,
   wherein the scaler differentiates rates at which a horizontal resolution and a vertical resolution of the multidimensional image are transformed and rates at which images of multiple dimensions are scaled, to transform the resolution of the multidimensional image,
   wherein the formatter comprises:
      a format transform unit which transforms the received multidimensional image into an image having a plurality of formats;
      a selection unit which selects a format processible by the display device from the plurality of formats; and
      a display interface unit which transforms an image having the selected format into an image signal acceptable by the display device and outputting the image signal.

2. The apparatus of claim 1, wherein the scaler comprises:
   a first scaler receiving a left image and transforming a resolution of the left image; and
   a second scaler receiving a right image and transforming a resolution of the right image.

3. The apparatus of claim 2, further comprising a video switch switching locations of the received left and right images and outputting the left and right images.

4. The apparatus of claim 2, further comprising a memory storing the scaled image data so that the left and right images are simultaneously output.

5. The apparatus of claim 3, wherein the user interface unit receives a command to control the video switch from a user and provides an input/output interface which receives the property information about the display device to control the formatter.

6. The apparatus of claim 5, wherein the user interface unit includes a port transceiving the property information about the display device.

7. The apparatus of claim 6, wherein the property information about the display device includes the resolution of the display device, information about a frequency of an input signal, and information about a format of an image, and the port of the user interface unit is one of a display data channel (DDC) port, a DDC2 port, and a DDC2B port.

8. The apparatus of claim 1, wherein the display interface unit transforms the image having the selected format into a signal conforming to a Video Electronics Standard Association (VESA) standard.

9. A method of transforming a format of a multidimensional image, the method comprising:
   receiving the multidimensional image and scaling up or down a resolution of the multi-dimensional image to conform to a resolution of a display device;
   receiving, by a user interface unit, the property information about properties of the display device from the display device and transmitting the received property information to a formatter, and
   receiving, by the formatter, the property information and transforming, by the formatter, the format of the multi-dimensional image to conform to the properties of the display device,
   wherein in the receiving of the multidimensional image and scaling up or down of the resolution of the multidimensional image, the resolution is transformed by differentiating rates at which a horizontal resolution and a vertical resolution of the multidimensional image are transformed and rates at which images of multiple dimensions are scaled,
   wherein the receiving of the property information and transforming of the format of the multi-dimensional image comprises:
   receiving the property information about the display device;
   transforming the received multidimensional image into an image having a plurality of formats;
   selecting a format processible by the display device from the plurality of formats; and
   transforming an image having the selected format into an image signal acceptable by the display device and outputting the image signal.

10. The method of claim 9, wherein in the receiving of the multidimensional image and scaling up or down of the resolution of the multidimensional image, a left image is received, a resolution of the left image is transformed, a right image is received, and a resolution of the right image is transformed.

11. The method of claim 10, wherein in the receiving of the multidimensional image and scaling up or down of the resolution of the multidimensional image, ports via which the left and right images are to be output are switched, and the left and right images are output via the switched ports.

12. The method of claim 9, wherein the property information about the display device includes the resolution of the display device, information about a frequency of an input signal, and information about a format of an image, and the port of the user interface unit is one of a display data channel (DDC) port, a DDC2 port, and a DDC2B port.

13. The method of claim 9, wherein in the transforming of the image having the selected format, the image having the selected format is transformed into a signal conforming to a Video Electronics Standard Association (VESA) standard.

14. A non-transitory computer readable recording medium which records a computer program for executing the method of claim 9.

* * * * *